Feb. 7, 1928.

R. R. BROWN 1,658,221

DENTAL FLOSS HOLDER

Filed March 4, 1927

Robert R. Brown   Inventor

By his Attorneys
Gifford & Scull

Patented Feb. 7, 1928.

1,658,221

UNITED STATES PATENT OFFICE.

ROBERT R. BROWN, OF MONTCLAIR, NEW JERSEY.

DENTAL-FLOSS HOLDER.

Application filed March 4, 1927. Serial No. 172,583.

It is well known that by the use of the usual tooth brushes, it is impossible to clean thoroughly between the teeth. An effective way to clean between the teeth is by means of dental floss. In view of the fact that the outer ends of the teeth are closer together than the portions next to the gums, it frequently happens that because of the force necessary to pass the floss between the teeth, it snaps against the gums and frequently injures the same. In addition, unsanitary conditions often make it inadvisable to use the fingers for passing the floss between the teeth. It is very important that the teeth be cleaned, not only along the exposed surfaces, but between the same, as the decay frequently starts because of the fact that food lodges between the teeth and is not removed with tooth brushes or tooth picks, as the food frequently becomes merely packed even tighter between the teeth by attempts to remove the same in this way.

By the present invention, the dental floss can be passed between the teeth very easily without the danger of injuring the gums by the floss striking the same with considerable force. Also, the floss can be used without inserting the fingers in the mouth and, at the same time, the passing of the floss between the teeth is effected by the use of the jaws in such a manner that the positions to which the floss is moved are readily controlled. Also, the device provides a guard that will protect the gums from injury by the floss because of the fact that the end of the tooth stops the device and prevents the floss from going too far.

Figure 1:
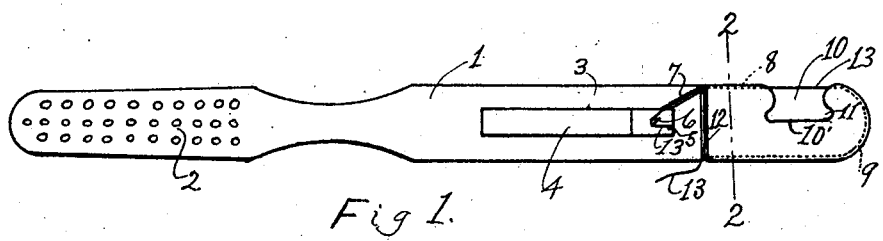
Figure 2:
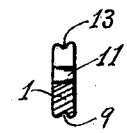

The invention will be understood from the description in connection with the accompanying drawings, in which Fig. 1 is a side view of the device; Fig. 2 is a section along the line 2—2 of Fig. 1, and Fig. 3 is a view similar to Fig. 1, partly broken away showing a modification.

In the drawings, reference character 1 indicates the handle of a tooth brush that is provided at the brush ends with the usual hairs or bristles 2. A rectangular slot or opening 3 is cut into or through the handle of such a size as to accommodate a dental floss container or holder 4, so that the same will fit tightly into the slot or opening and be retained by frictional engagement. The container 4 is provided with the usual opening 5 through which the floss may be withdrawn, and with the sharp edged cutter 6 for severing the floss after the proper length thereof has been withdrawn. A groove 7 leads from the opening 3 to an edge of the handle that is provided with a groove 8, along which the floss lies. The groove extends around the end of the handle and along the other edge, as indicated at 9. The edge is provided with a recess 10 near the end of the handle equal in depth to the approximate length of the exposed portions of the teeth that are to be cleaned. A cut-out portion 11 is provided at the end of the recess 10 for convenience in hanging the tooth brush upon a hook or nail. A cross groove 12 extends around the handle and intersects the grooves 8 and 9. In using the device, a length of floss is withdrawn from the container 4 while it remains in position in the slot or opening 3, and is passed along the grooves 7 and 8, across the recess 10, along the groove 9, and then several turns are made around the handle in the groove 12, thereby retaining the floss in position so that the portion extending across the recess 10 is kept taut. The end of the handle is inserted into the mouth a sufficient distance to place the portion of the floss 13, that bridges the recess 10, between two teeth, and the jaws are moved with the teeth of the opposite jaw bearing against the other edge of the handle, so as to force the bridging portion of the floss between the desired teeth. The approach of the jaws must be, of course, controlled muscularly to prevent the floss from injuring the gums after it has passed a sufficient distance between the teeth, but if by accident there is a tendency to force the floss in too far, the bottom of the recess 10' will be struck by the ends of the teeth that are being cleaned, thereby preventing the floss from injuring the gums.

Figure 3:
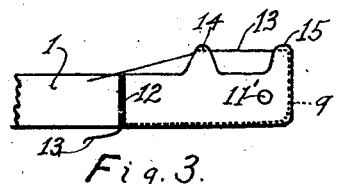

In the modification shown in Fig. 3, the same parts are designated by the same reference characters. This modification differs from the embodiment of the invention already described in that instead of having a recess 10, as described above, projections 14 and 15 with grooves at the outer ends thereof, may be provided for receiving the floss, and having a bridging portion of the same spaced a predetermined distance from a flat surface that will control the depth to which the floss is inserted. In this modification, a hole 11' is provided for hanging up the tooth brush, and the operation is similar to that already described.

I claim:

1. In a device for retaining dental floss in position to clean between teeth, a member having a groove along its opposite edges and a recess adapted to be bridged by the floss in said groove.

2. In a device for retaining dental floss in position to clean between teeth, a member having a groove along its opposite edges and a recess adapted to be bridged by the floss in said groove, the depth of said recess being substantially equal to the exposed length of the tooth to be cleaned.

3. In a device for retaining dental floss in position to clean between teeth, a member having a groove along its opposite edges, a recess adapted to be bridged by the floss in said groove, and a groove for the floss transverse to said first named groove.

4. In a device for retaining dental floss in position to clean between teeth, a member having a groove along its opposite edges and its end, and a recess adapted to be bridged by the floss in said groove.

5. In a device for retaining dental floss in position to clean between teeth, a member having spaced portions, means to keep the floss taut between said portions and a flat surface between said portions adapted to be struck by the ends of the teeth as they are being cleaned.

6. A tooth brush handle provided with an opening to receive a dental floss container and having a groove along its opposite edges to receive floss, with a recess interrupting said groove.

7. A tooth brush handle provided with an opening to receive a dental floss container and having a groove along its opposite edges and across its sides to receive floss, with a recess interrupting said groove.

ROBERT R. BROWN.